(12) United States Patent
Kim et al.

(10) Patent No.: US 12,092,820 B2
(45) Date of Patent: Sep. 17, 2024

(54) HOLOGRAPHIC VIRTUAL REALITY DISPLAY

(71) Applicant: NVIDIA Corporation, Santa Clara, CA (US)

(72) Inventors: Jonghyun Kim, San Jose, CA (US); Ward Lopes, Redwood City, CA (US); David Luebke, Charlottesville, VA (US); Manu Gopakumar, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 255 days.

(21) Appl. No.: 17/475,081

(22) Filed: Sep. 14, 2021

(65) Prior Publication Data

US 2022/0334392 A1 Oct. 20, 2022

Related U.S. Application Data

(60) Provisional application No. 63/176,108, filed on Apr. 16, 2021.

(51) Int. Cl.
  *G02B 27/01* (2006.01)
  *G02B 7/04* (2021.01)
  (Continued)

(52) U.S. Cl.
  CPC ........... *G02B 27/0103* (2013.01); *G02B 7/04* (2013.01); *G02B 27/0172* (2013.01);
  (Continued)

(58) Field of Classification Search
  CPC .. G02B 27/0103; G02B 7/04; G02B 27/0172; G02B 2027/0174; G02B 2027/0178;
  (Continued)

(56) References Cited

U.S. PATENT DOCUMENTS 10,254,542 B2 * 4/2019 Kollin ................ G03B 21/2066
10,423,222 B2 * 9/2019 Popovich .............. G02F 1/2955
(Continued)

OTHER PUBLICATIONS

Huang et al., "Out-of-plane computer-generated multicolor waveguide holography," Optica, vol. 6, No. 2, Feb. 2019, pp. 119-124.
(Continued)

*Primary Examiner* — Dmitriy Bolotin
(74) *Attorney, Agent, or Firm* — Zilka-Kotab, P.C.

(57) ABSTRACT

Virtual reality (VR) displays are computer displays that present images or video in a manner that simulates a real experience for the viewer. In many cases, VR displays are implemented as head-mounted displays (HMDs) which provide a display in the line of sight of the user. Because current HMDs are composed of a display panel and magnifying lens with a gap therebetween, proper functioning of the HMDs limits their design to a box-like form factor, thereby negatively impacting both comfort and aesthetics. The present disclosure provides a different configuration for a virtual reality display which allows for improved comfort and aesthetics, including specifically at least one coherent light source, at least one holographic waveguide coupled to the at least one coherent light source to receive light therefrom, and at least one spatial light modulator coupled to the at least one holographic waveguide to modulate the light.

27 Claims, 13 Drawing Sheets

(51) Int. Cl.
*G03H 1/22* (2006.01)
*G06F 3/01* (2006.01)
*G06T 19/00* (2011.01)

(52) U.S. Cl.
CPC ........... *G03H 1/2294* (2013.01); *G06F 3/013* (2013.01); *G06T 19/006* (2013.01); *G02B 2027/0174* (2013.01); *G02B 2027/0178* (2013.01); *G03H 2223/16* (2013.01); *G03H 2223/19* (2013.01); *G03H 2223/22* (2013.01)

(58) Field of Classification Search
CPC .............. G02B 27/0081; G02B 27/286; G02B 27/4272; G02B 2027/015; G03H 1/2294; G03H 2223/16; G03H 2223/19; G03H 2223/22; G03H 2223/20; G03H 2223/17; G03H 2223/23; G03H 1/0808; G06F 3/013; G06T 19/006
See application file for complete search history.

(56) References Cited

U.S. PATENT DOCUMENTS

| | | | | |
|---|---|---|---|---|
| 10,564,718 | B2* | 2/2020 | Na | G06T 7/514 |
| 10,761,599 | B2* | 9/2020 | Na | G06V 40/193 |
| 10,983,340 | B2* | 4/2021 | Popovich | G02B 6/0026 |
| 11,256,086 | B2* | 2/2022 | Amirsolaimani | G02B 6/27 |
| 2006/0228073 | A1* | 10/2006 | Mukawa | G02B 5/18 385/31 |
| 2013/0100511 | A1* | 4/2013 | Yamamoto | G03H 1/2294 359/9 |
| 2013/0222384 | A1* | 8/2013 | Futterer | H04N 13/344 345/426 |
| 2013/0308185 | A1* | 11/2013 | Robinson | F21V 13/12 359/465 |
| 2014/0240828 | A1* | 8/2014 | Robinson | G02B 6/0048 362/613 |
| 2014/0285429 | A1* | 9/2014 | Simmons | G02B 27/0179 359/259 |
| 2015/0160529 | A1* | 6/2015 | Popovich | G02B 26/101 359/200.8 |
| 2016/0018654 | A1* | 1/2016 | Haddick | G06F 3/011 345/8 |
| 2016/0062121 | A1* | 3/2016 | Border | G02B 27/0176 359/630 |
| 2016/0349444 | A1* | 12/2016 | Robinson | G02B 6/0068 |
| 2017/0242264 | A1* | 8/2017 | Sissom | G02B 27/0172 |
| 2017/0357101 | A1* | 12/2017 | Tervo | G06T 19/006 |
| 2018/0052320 | A1* | 2/2018 | Curtis | G06F 1/203 |
| 2018/0120563 | A1* | 5/2018 | Kollin | G03B 21/005 |
| 2018/0232048 | A1* | 8/2018 | Popovich | G02B 6/105 |
| 2018/0275410 | A1* | 9/2018 | Yeoh | H04N 13/344 |
| 2018/0292053 | A1* | 10/2018 | Minor | F21K 9/61 |
| 2018/0335629 | A1* | 11/2018 | Cheng | G09G 3/24 |
| 2018/0364482 | A1* | 12/2018 | Georgiou | G02B 27/0101 |
| 2019/0086674 | A1* | 3/2019 | Sinay | G02B 27/283 |
| 2019/0179149 | A1* | 6/2019 | Curtis | G02B 27/01 |
| 2019/0187482 | A1* | 6/2019 | Lanman | G02B 27/0179 |
| 2019/0293138 | A1* | 9/2019 | Haba | G02B 1/02 |
| 2019/0339449 | A1* | 11/2019 | Shipton | G02B 6/122 |
| 2020/0043391 | A1* | 2/2020 | Maimone | G02B 27/017 |
| 2020/0049992 | A1* | 2/2020 | Peng | G06F 3/012 |
| 2020/0192130 | A1* | 6/2020 | Maimone | G02B 27/0172 |
| 2020/0292745 | A1* | 9/2020 | Waldern | G02B 6/0068 |
| 2020/0292851 | A1* | 9/2020 | Maimone | G02B 6/0035 |
| 2020/0301239 | A1* | 9/2020 | Akkaya | G02B 27/0172 |
| 2020/0310120 | A1* | 10/2020 | Grief | G02B 6/26 |
| 2020/0341194 | A1* | 10/2020 | Waldern | G02F 1/13342 |
| 2020/0371389 | A1* | 11/2020 | Geng | G02B 6/0028 |
| 2021/0048673 | A1* | 2/2021 | Yan | G02F 1/294 |
| 2021/0048674 | A1* | 2/2021 | Yan | G02B 27/283 |
| 2021/0072453 | A1* | 3/2021 | Peng | G02F 1/1393 |
| 2021/0356742 | A1* | 11/2021 | Hong | G02B 27/0172 |
| 2021/0364808 | A1* | 11/2021 | Koshelev | G02B 5/04 |
| 2022/0004003 | A1* | 1/2022 | Eash | G02B 6/002 |
| 2022/0187601 | A1* | 6/2022 | Morozov | G02B 27/0081 |
| 2022/0334395 | A1* | 10/2022 | Kim | G03H 1/2294 |
| 2023/0019309 | A1* | 1/2023 | Chriki | G03B 21/147 |

OTHER PUBLICATIONS

Maimone et al., "Holographic Optics for Thin and Lightweight Virtual Reality," ACM Transactions on Graphics, vol. 39, No. 4, Article 67, Jul. 2020, p. 14 pages.

Yeom et al., "3D holographic head mounted display using holographic optical elements with astigmatism aberration compensation," Optics Express, vol. 23, No. 25, Dec. 14, 2015, 10 pages.

Kim et al., U.S. Appl. No. 17/670,337, filed Feb. 11, 2022.

Akeley et al., "A Stereo Display Prototype with Multiple Focal Distances," SIGGRAPH, Aug. 1, 2004, pp. 804-813.

Aksit et al., "Slim near-eye display using pinhole aperture arrays," applied optics, vol. 54, No. 11, Apr. 10, 2015, pp. 3422-3427.

Bang et al., "Lenslet VR: Thin, Flat and Wide-FOV Virtual Reality Display Using Fresnel Lens and Lenslet Array," IEEE Transactions on Visualization and Computer Graphics, vol. 27, No. 5, May 2021, pp. 2545-2554.

Cakmakci et al., "Holographic pancake optics for thin and lightweight optical see-through augmented reality," Optics Express, vol. 29, No. 22, Oct. 25, 2021, pp. 35206-35215.

Cakmakci et al., "Head-Worn Displays: A Review," Journal of Displays Technology, vol. 2, No. 3, Sep. 2006, pp. 199-216.

Chakravarthula et al., "Wirtinger Holography for Near-Eye Displays," ACM Transactions on Graphics, vol. 38, No. 6, Nov. 2019, 13 pages.

Chakravarthula et al., "Learned Hardware-in-the-loop Phase Retrieval for Holographic Near-Eye Displays," ACM Transactions on Graphics, vol. 39, No. 6, Dec. 2020, pp. 1-18.

Chang et al., "Toward the next-generation VR/AR optics: a review of holographic near-eye displays from a human-centric perspective," Optica, vol. 7, No. 11, Nov. 2020, pp. 1563-1578.

Chang et al., "Towards Multifocal Displays with Dense Focal Stacks," ACM Transactions on Graphics, vol. 37, No. 6, Nov. 2018, 13 pages.

Choi et al., "Neural 3D Holography: Learning Accurate Wave Propagation Models for 3D Holographic Virtual and Augmented Reality Displays," ACM Transactions on Graphics, vol. 40, No. 6, Dec. 2021, 12 pages.

Dunn et al., "Wide Field of View Varifocal Near-Eye Display Using See-Through Deformable Membrane Mirrors," IEEE Transactions on Visualization and Computer Graphics, Jan. 2017, 11 pages.

Gopakumar et al., "Unfiltered holography: optimizing high diffraction orders without optical filtering for compact holographic displays," Optics Letters, vol. 46, No. 23, Dec. 1, 2021, pp. 5822-5825.

Hua et al., "A 3D integral imaging optical see-through head mounted display," Optics Express, vol. 22, No. 11, Jun. 2, 2014, pp. 13484-13491.

Jang et al., "Holographic Near-eye Display with Expanded Eyebox," ACM Transactions on Graphics, vol. 37, No. 6, Nov. 2018, pp. 1-14.

Jang et al., "Retinal 3D: Augmented Reality Near-Eye Display via Pupil-Tracked Light Field Projection on Retina," ACM Transactions on Graphics, vol. 36, No. 6, Nov. 2017, pp. 1-13.

Kim et al., "Foveated AR: Dynamically-Foveated Augmented Reality Display," ACM Transactions on Graphics, vol. 38, No. 4, Jul. 2019, pp. 1-15.

Konrad et al., "Novel Optical Configurations for Virtual Reality: Evaluating User Preference and Performance with Focus-tunable and Monovision Near-eye Displays," Proceedings of the 2016 CHI Conference on Human Factors in Computing Systems, May 2016, pp. 1211-1220.

Koulieris et al., "Near-Eye Display and Tracking Technologies for Virtual and Augmented Reality," Eurographics, vol. 38, No. 02, 2019, 28 pages.

Kramida et al., "Resolving the Vergence-Accommodation Conflict in Head Mounted Displays," preprint, IEEE, 2015, 17 pages, retrieved from https://www-hlb.cs.umd.edu/sites/default/files/scholarly_papers/Kramida.pdf.

(56) References Cited

OTHER PUBLICATIONS

Kress, B., "Optical Architectures for Augmented-, Virtual-, and Mixed-Reality Headsets," SPIE Press, 2020, 274 pages.
Lambooij et al., "Visual Discomfort and Visual Fatigue of Stereoscopic Displays: A Review," Journal of Imaging Science and Technology, vol. 53, No. 3, May/Jun. 2009, 14 pages.
Lanman et al., "Near-Eye Light Field Displays," ACM Transactions on Graphics, vol. 32, No. 6, Nov. 2013, 10 pages, retrieved from https://research.nvidia.com/publication/near-eye-light-field-displays-0.
Lee et al., "Recent progress in Pancharatnam-Berry phase optical elements and the applications for virtual/augmented realities," Optical Data Processing and Storage, vol. 3, 2017, pp. 79-88.
Liu et al., "An Optical See-Through Head Mounted Display with Addressable Focal Planes," IEEE International Symposium on Mixed and Augmented Reality, Sep. 2008, pp. 33-42.
Love et al., "High-speed switchable lens enables the development of a volumetric stereoscopic display," Optics Express, vol. 17, No. 18, Aug. 31, 2009, pp. 15716-15725.
Maimone et al., "Pinlight Displays: Wide Field of View Augmented Reality Eyeglasses using Defocused Point Light Sources," ACM Transactions on Graphics,, vol. 33, No. 4, Jul. 2014, pp. 89:1-89:11.
Moon et al., "Compact Augmented Reality Combiner Using Pancharatnam-Berry Phase Lens," IEEE Photonics Technology Letters, vol. 32, No. 5, Mar. 1, 2020, pp. 235-238.
Nam et al., "Aberration-corrected full-color holographic augmented reality near-eye display using a Pancharatnam-Berry phase lens," Optics Express, vol. 28, No. 21, Oct. 2020, pp. 30836-30850.
Narasimhan, B., "Ultra-Compact pancake optics based on ThinEyes® super-resolution technology for virtual reality headsets," Digital Optics for Immersive Displays, vol. 10676, 2018, 10 pages.
Padmanaban et al., "Optimizing virtual reality for all users through gaze-contingent and adaptive focus displays," PNAS, vol. 114, No. 9, Feb. 28, 2017, pp. 2183-2188.
Padmanaban et al., "Holographic Near-Eye Displays Based on Overlap-Add Stereograms," ACM Transactions on Graphics, vol. 38, No. 6, Nov. 2019, pp. 214:1-214:13.
Pamplona et al., "Photorealistic Models for Pupil Light Reflex and Iridal Pattern Deformation," ACM Transactions on Graphics, vol. 28, No. 4, Aug. 2009, pp. 106:1-106:12.
Peng et al., "Speckle-free holography with partially coherent light sources and camera-in-the-loop calibration," Science Advances, vol. 7, Nov. 12, 2021, pp. 1-6.
Peng et al., "Neural Holography with Camera-in-the-loop Training," ACM Transactions on Graphics, vol. 39, No. 6, Dec. 2020, pp. 185:1-185:14.
Perkinscoie, "2019 Augmented and Virtual Reality Survey Report," PerkinsCoie, 2019, 25 pages, retrieved from https://www.perkinscoie.com/images/content/2/1/v4/218679/2019-VR-ARSurvey-Digital-v1.pdf.
Perkinscoie, "XR Industry Insider 2021 XR Survey: Industry Insights into the Future of Immersive Technology," PerkinsCoie, Jul. 2021, 22 pages, retrieved from https://www.perkinscoie.com/content/designinteractive/xr2021/assets/downloads/XR_Industry_Insider_2021_XR_Survey.pdf.
Ratcliff et al., "ThinVR: Heterogeneous microlens arrays for compact, 180 degree FOV VR near-eye displays," IEEE Transactions on Visualization and Computer Graphics, vol. 26, No. 5, May 2020, pp. 1981-1990.
Rathinavel et al., "An Extended Depth-of-Field Volumetric Near-Eye Augmented Reality Display," IEEE Transactions on Visualization and Computer Graphics, vol. 24, No. 11, Nov. 2018, pp. 2857-2866.
Rolland et al., "Multifocal planes head-mounted displays," Applied Optics, vol. 39, No. 19, Jul. 1, 2000, pp. 3209-3215.
Shibata et al., "The zone of comfort: Predicting visual discomfort with stereo displays," Journal of Vision, vol. 11, 2011, pp. 1-29.
Watson et al., "A unified formula for light-adapted pupil size," Journal of Vision, vol. 12, Sep. 25, 2012, pp. 1-16.
Xiong et al., "Augmented reality and virtual reality displays: emerging technologies and future perspectives," Light: Science & Applications, vol. 10, No. 216, 2021, pp. 1-30.
Yoo et al., "Foveated display system based on a doublet geometric phase lens," Optics Express, vol. 28, No. 16, Aug. 3, 2020, 13 pages.
Zhan et al., "Augmented Reality and Virtual Reality Displays: Perspectives and Challenges," iScience, vol. 23, Aug. 21, 2020, pp. 1-13.
Shi et al., "Towards real-time photorealistic 3D holography with deep neural networks," Nature, vol. 591, Mar. 11, 2021, 20 pages.
Non-Final Office Action from U.S. Appl. No. 17/670,337, dated Jul. 27, 2023.

\* cited by examiner

HOLOGRAPHIC VIRTUAL REALITY DISPLAY

RELATED APPLICATION(S)

This application claims the benefit of U.S. Provisional Application No. 63/176,108 titled "VIRTUAL REALITY DISPLAY WITH HOLOGRAPHIC OPTICS," filed Apr. 16, 2021, the entire contents of which is incorporated herein by reference.

TECHNICAL FIELD

The present disclosure relates to virtual reality displays.

BACKGROUND

Virtual reality (VR) displays are computer displays that present images or video in a manner that simulates a real experience for the viewer. For example, VR displays may present a three-dimensional (3D) environment, which may or may not be interactive. VR displays are useful for various applications that employ VR, such as entertainment (e.g. video games), education (e.g. training), and business (e.g. meetings), etc.

In many cases, VR displays are implemented as head-mounted displays (HMDs). HMDs are, by definition, worn on the head of a user to provide a display in the line of sight of the user. By viewing the display, the user is able to experience VR. In an effort to encourage more widespread use of HMDs, it has been important to focus HMD designs on more comfortable form factors, higher performance, and improved aesthetics.

To date, however, the typical configuration of HMDs limits their comfort and aesthetics. In particular, a HMD is currently composed of a display panel and magnifying lens (i.e. eye piece). In order to provide a perceptible image to the user, the distance between the display panel and the lens should be slightly smaller than the focal length of the lens. Since it is not feasible to make a very short focal length lens in a given aperture size, current HMDs have a box-like form factor and accordingly do not replicate the traditional form of eye glasses, which negatively impacts both their comfort and aesthetics.

There is a need for addressing these issues and/or other issues associated with the prior art.

SUMMARY

An apparatus and associated method are disclosed for a holographic virtual reality (VR) display. The VR display includes at least one coherent light source, at least one holographic waveguide coupled to the at least one coherent light source to receive light therefrom, and at least one spatial light modulator coupled to the at least one holographic waveguide to modulate the light.

DETAILED DESCRIPTION

Figure 1:
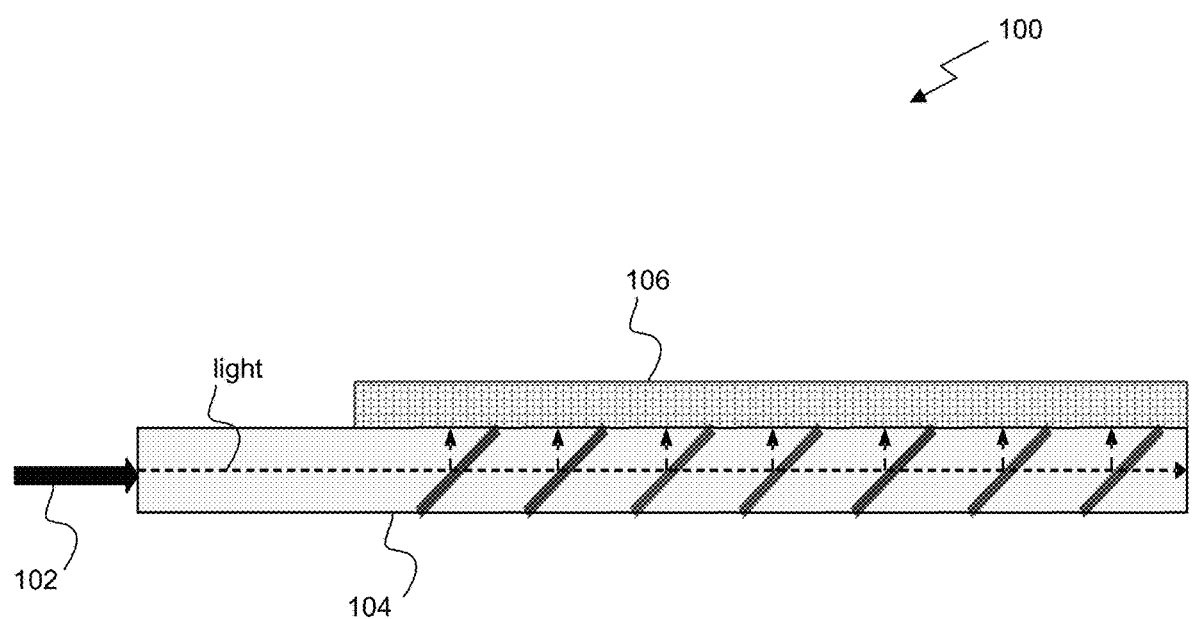
FIG. 1 illustrates a holographic VR display having a coherent light source, a holographic waveguide, and a spatial light modulator, in accordance with an embodiment.

FIG. 1 illustrates a holographic VR display 100 having a coherent light source, a holographic waveguide, and a spatial light modulator, in accordance with an embodiment. In the context of the present description, the holographic VR display 100 is a device configured to display VR images and/or VR video for viewing by a user. In one embodiment, the holographic VR display 100 may be a HMD capable of being worn on a head of the user to provide the display in the line of sight of the user.

As shown, the VR display 100 includes at least one coherent light source 102, at least one holographic waveguide 104, and at least one spatial light modulator 106. While these elements of the holographic VR display 100 are described below as being coupled (and shown to be directly coupled), at least in part, to one another, it should be noted that in the context of the present description, the term "coupled" may refer to any direct coupling (i.e. with nothing therebetween), any indirect coupling (i.e. with one or more elements or space situated therebetween), partial coupling, completing coupling, and/or any other coupling capable of connecting different elements. Any gaps or space between elements may be unfilled (e.g. composed of air) or may be filled with some substance, such as an anti-reflective coating.

Also in the context of the present description, a coherent light source 102 refers to any light source that is capable of outputting light of any type (e.g. plain, encoded with data, etc.) that is at least partially coherent (e.g. only partially coherent, completely coherent, etc.). Coherent light may refer to a beam of photons that, at least in part, have the same frequency, such as a laser beam output by a laser source. In one embodiment, the VR display 100 may include a single coherent light source 102, optionally with the capability to output light in a plurality of different colors. In another embodiment, the VR display 100 may include a plurality of coherent light sources 102, each capable of outputting light in a different color. In the case of a plurality of coherent light sources 102, the coherent light sources 102 may be time-multiplexed such that light is output by the coherent light sources 102 in a time-multiplexed manner.

In one embodiment, the coherent light source 102 may include a point light source that emits the light, a concave mirror that reflects the light emitted by the point light source, and a beam splitter that directs the light reflected by the concave mirror.

The coherent light source 102 is coupled to at least one holographic waveguide 104 such that the at least one holographic waveguide 104 receives light from the coherent light source 102. For example, the aforementioned beam splitter may direct the light reflected by the concave mirror to the holographic waveguide 104. In the context of the present description, a holographic waveguide 104 refers to any waveguide (which may include a lightguide) that includes at least one holographic element or function. For example, the holographic waveguide 104 may use the at least one holographic element or function to direct the light received from the coherent light source 102 (e.g. as shown by the arrows in FIG. 1 directing the light received from the coherent light source 102).

In one embodiment, the at least one holographic waveguide 104 may include a backlight holographic waveguide. For example, the backlight holographic waveguide may include a plurality of mirrors to direct the light received from the coherent light source 102 towards at least one spatial light modulator 106, as described in more detail below. In another embodiment, the at least one holographic waveguide 104 may include a holographic waveguide with at least one waveguide coupler. For example, the at least one holographic waveguide 104 may include a holographic waveguide with a waveguide in-coupler, and a waveguide out-coupler. The waveguide in-coupler may refract light received from the coherent light source 102 to cause it to travel through the holographic waveguide 104 to the waveguide out-coupler which may in turn direct the light towards the at least one spatial light modulator 106, again as described in more detail later.

In any case, the holographic waveguide 104 may be configured such that coherence of the light output by the coherent light source 102 is maintained, at least in part, when traveling through the holographic waveguide 104. Additionally, the holographic waveguide 104 may be configured such that polarization of the light output by the coherent light source 102 is maintained, at least in part, when traveling through the holographic waveguide 104. Further, the holographic waveguide 104 may be configured such that a direction of the light (which may be perpendicular to the holographic waveguide 104), when output by the holographic waveguide 104, is maintained at least in part.

The at least one holographic waveguide 104 is coupled to at least one spatial light modulator 106 to modulate the light. In the context of the present description, a spatial light modulator 106 refers to any device or component that at least partially spatially varies a modulation of light. Accordingly, the spatial light modulator 106 may impose, at least in part, a spatially varying modulation on the light transmitted (e.g. output) by the holographic waveguide 104. In one embodiment, the at least one spatial light modulator 106 may be directly coupled to the at least one holographic waveguide 104 with no space (i.e. gap) therebetween. In one embodiment, the at least one spatial light modulator 106 may be indirectly coupled to the at least one holographic waveguide 104 with a space (and/or some other material) therebetween.

The spatial light modulator 106 may be the display plane of the VR display 100. In an embodiment, the spatial light modulator 106 may create the VR image or video behind the spatial light modulator 106 (from the point of view of an eye of the user of the VR display 100). In another embodiment, the spatial light modulator 106 may be a reflective spatial light modulator 106. In an embodiment, the spatial light modulator 106 is driven using pixel data received from an image source. As an option, a receiver of the VR display 100 may receive the pixel data from a remote source. Of course, in another embodiment the pixel data may be generated locally with respect to the VR display 100.

By this configuration of the VR display 100, any gap between the at least one holographic waveguide 104 and at least one spatial light modulator 106 may be reduced or eliminated. As a result, a cross-sectional thickness of the VR display 100, or in particular a combined cross-sectional thickness of the at least one holographic waveguide 104 and at least one spatial light modulator 106, may be less than 10 millimeters (mm) in one embodiment. In another embodiment, the cross-sectional thickness of the VR display 100, or in particular a combined cross-sectional thickness of the at least one holographic waveguide 104 and at least one spatial light modulator 106, may be less than 7 mm. In still other embodiments, such combined cross-sectional thickness may be less than 9 mm, 8 mm, etc.

Furthermore, even with the reduced or eliminated gap mentioned above, a quality of VR images and/or video displayed by the VR display 100 may be improved with regard to traditional VR displays. In one embodiment, this may be achieved by using a coherent light source 102 with a coherent length that is larger than a length of the spatial light modulator 106, thereby ensuring light interference. Still yet, the above described configuration of the VR display 100 may support three-dimensional (3D) VR images and/or video. For example, the spatial light modulator 106 may be capable of displaying 3D images and/or video behind the spatial light modulator 106 plane (virtual).

As an option, the VR display 100 may be configured such that the light is not polarized. As another option, the VR display 100 may be configured such that the light is polarized. As yet another option, the VR display 100 may not necessarily include a beam splitter. As still yet another option, the VR display 100 may be filterless, and for example may rely on a propagation pipeline that uses simulation to determine a phase and amplitude to be used by the spatial light modulator 106.

It should be noted that while VR display 100 is described above as including a coherent light source 102, a holographic waveguide 104, and a spatial light modulator 106, other embodiments are contemplated in which a VR display includes additional elements. FIGS. 2-7 described below provide other possible embodiments of a VR display. Just by way of example, in one embodiment a VR display may include at least one magnifying lens (e.g. see at least FIG. 2), which may be a Fresnel lens or a holographic lens. In another embodiment, a VR display may include at least one polarization element coupled between the at least one magnifying lens and the at least one holographic waveguide (e.g. see FIG. 4). In yet another embodiment, a VR display may include at least one quarter-wave element coupled between the at least one holographic waveguide and the at least one spatial light modulator (e.g. see FIG. 4). Moreover, FIG. 10 describes a method of operation of a HMD configured according to one or more of the embodiments described herein.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described. For example, in one embodiment, the VR display 100 may include a receiver that receives pixel data (e.g. representing the VR images or VR video) from a remote source over a network, for display via the holographic VR display 100. The remote source may be any computer system capable of transmitting the pixel data to the VR display 100 via the network. For example, the remote source may be a server, video game console, mobile device (e.g. of a user), or any other computer system, such as that described below with reference to FIG. 9. The VR display 100 may use a wired or wireless connection to the network in order to receive the pixel data from the remote source.

Figure 2:
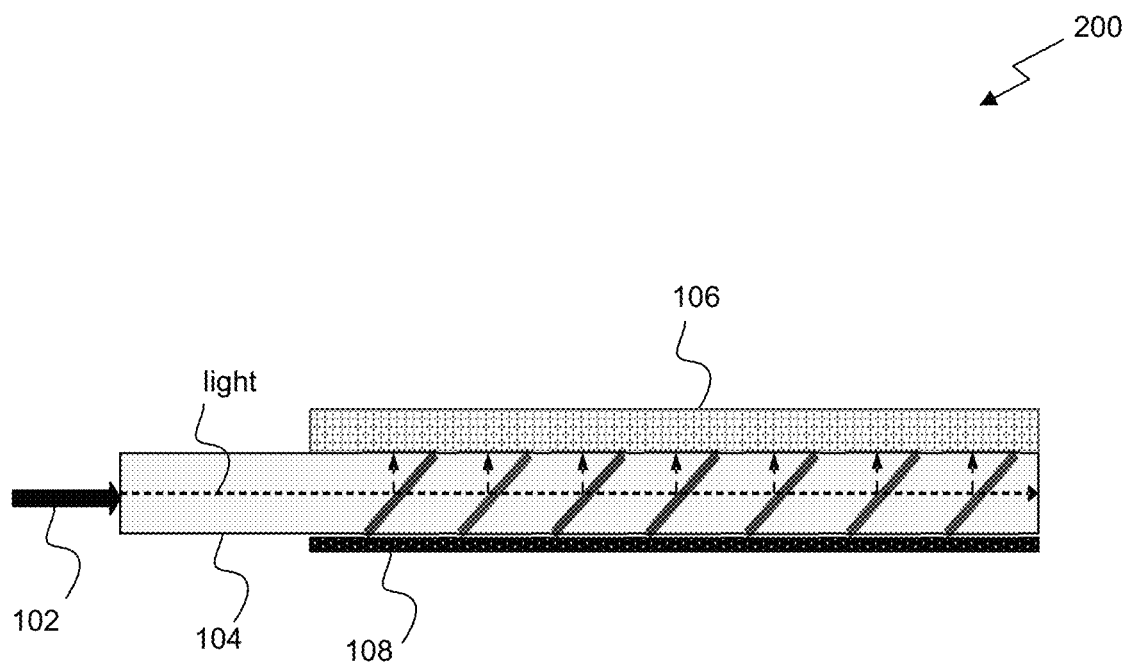
FIG. 2 illustrates a VR display having a coherent light source, a holographic waveguide, a spatial light modulator, and a magnifying lens, in accordance with an embodiment.

FIG. 2 illustrates a VR display 200 having a coherent light source, a holographic waveguide, a spatial light modulator, and a magnifying lens, in accordance with an embodiment. It should be noted that the aforementioned definitions and/or description may equally apply to the description below.

As shown, at least one holographic waveguide 104 is coupled to at least one coherent light source 102 to receive light therefrom. Additionally, at least one spatial light modulator 106 is coupled to a first face of the at least one holographic waveguide 104 to modulate the light. Further, with respect to the present embodiment, at least one magnifying lens 108 is coupled to a second face of the at least one holographic waveguide 104 that is opposite the first face of the at least one holographic waveguide 104. The magnifying lens 108 may be coupled to a user-facing side of the holographic waveguide 104. The at least one magnifying lens 108 may be a Fresnel lens in one embodiment. In another embodiment, the at least one magnifying lens 108 may be a holographic optical element. In yet another embodiment, the at least one magnifying lens 108 may be a diffractive optical element. In still yet another embodiment, the at least one magnifying lens 108 may be a meta-surface.

The at least one magnifying lens 108 may be an element of the VR display 200 that is viewed by a user of the VR display 200. For example, the modulated light may be transmitted from the at least one spatial light modulator 106 to the at least one magnifying lens 108 for output to an eye 110 of the user of the VR display 200. The magnifying lens 108 may magnify the VR image and/or video, where a focal length of the magnifying lens 108 may larger, at least slightly, than a distance between the at least one spatial light modulator 106 and the focusing optics. Incorporation of the magnifying lens 108 in the VR display 200 may widen the field of view for the user.

Figure 3:
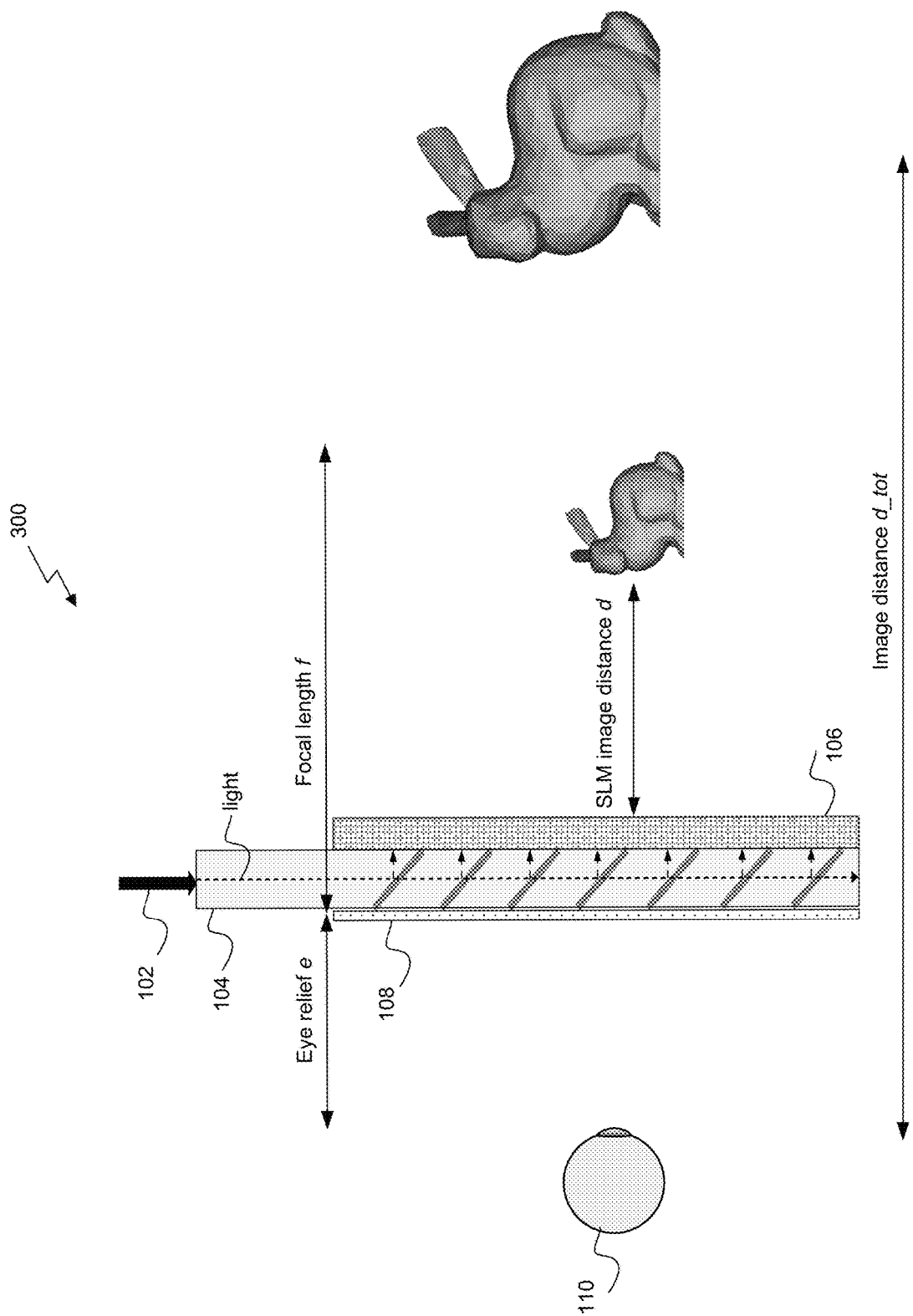
FIG. 3 illustrates an implementation of a VR display having a coherent light source, a holographic waveguide, a spatial light modulator, and a magnifying lens, in accordance with an embodiment.

FIG. 3 illustrates an implementation 300 of a VR display having a coherent light source, a holographic waveguide, a spatial light modulator, and a magnifying lens, in accordance with an embodiment. For example, the implementation 300 may include VR display 200 of FIG. 2. It should be noted that the aforementioned definitions and/or description may equally apply to the description below.

As shown, at least one holographic waveguide 104 is coupled to at least one coherent light source 102 to receive light therefrom. Additionally, at least one spatial light modulator 106 is coupled to a first face of the at least one holographic waveguide 104 to modulate the light. Further, with respect to the present embodiment, at least one at least one magnifying lens 108 is coupled to a second face of the at least one holographic waveguide 104 that is opposite the first face of the at least one holographic waveguide 104.

The at least one magnifying lens 108 is an element of the VR display 200 that is viewed by the eye 110 of a user of the VR display 200. In particular, in the present embodiment the modulated light may be transmitted from the at least one spatial light modulator 106 to the at least one magnifying lens 108 for output to the eye 110 of the user of the VR display 200.

In the present embodiment, light is transmitted by the at least one coherent light source 102 through the at least one holographic waveguide 104. The light output by the at least one holographic waveguide 104 is in turn transmitted to the spatial light modulator 106 for modulation thereof. The modulated light output by the spatial light modulator 106 is then transmitted through the magnifying lens 108 for output to the eye 110 of the user.

In the context of the present embodiment, the total image distance (d_tot) supported by the VR display is calculated as a function of the distance between the at least one magnifying lens 108 and the eye (e.g. pupil) of the user (i.e. eye relief e), the distance between the at least one magnifying lens 108 and the focusing optics (i.e. focal length f), and the distance between the at least one spatial light modulator 106 and the focusing optics (i.e. SLM image distance d). Table 1 illustrates an equation that may be used to calculate the total image distance (d_tot), by way of example.

$$d\_tot = (f/[f-d])d + e \qquad \text{Table 1}$$

Figure 4:
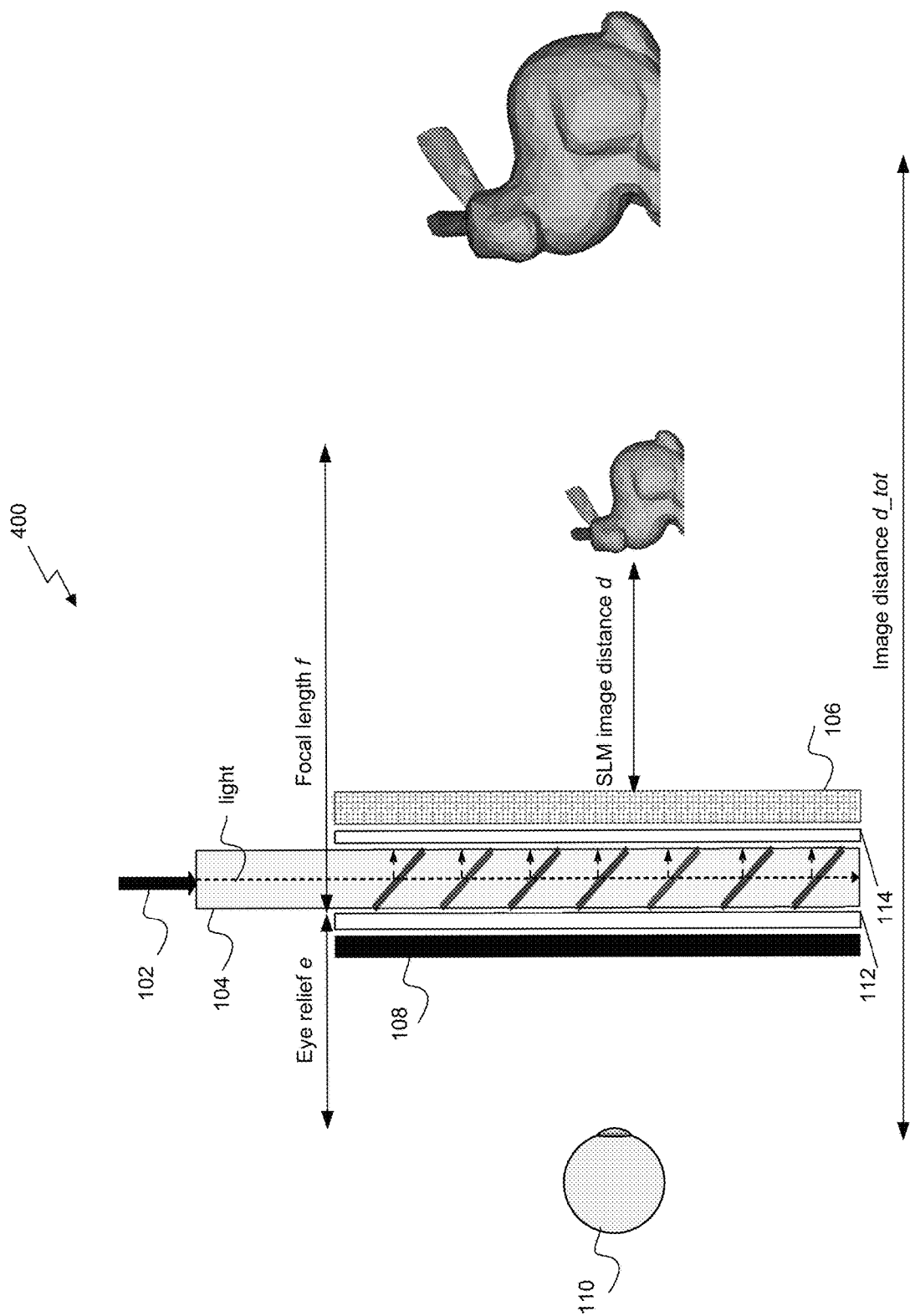
FIG. 4 illustrates an implementation of a VR display having a coherent light source, a holographic waveguide, a spatial light modulator, a magnifying lens, and a polarizer, in accordance with an embodiment.

FIG. 4 illustrates an implementation 400 of a VR display having a coherent light source, a holographic waveguide, a spatial light modulator, a magnifying lens, and a polarizer, in accordance with an embodiment. It should be noted that the aforementioned definitions and/or description may equally apply to the description below.

As shown, at least one holographic waveguide 104 is coupled to at least one coherent light source 102 to receive light therefrom. Additionally, at least one spatial light modulator 106 is indirectly coupled to a first face of the at least one holographic waveguide 104 to modulate the light. Situated (coupled) between the at least one spatial light modulator 106 and the at least one holographic waveguide 104 is a quarter-wave plate 114. Further, with respect to the present embodiment, at least one at least one magnifying lens 108 is indirectly coupled to a second face of the at least one holographic waveguide 104 that is opposite the first face of the at least one holographic waveguide 104. Situated (coupled) between the at least one at least one magnifying lens 108 and the at least one holographic waveguide 104 is a polarizer 112.

The at least one magnifying lens 108 is an element of the VR display 200 that is viewed by the eye 110 of a user of the VR display 200. In particular, in the present embodiment the modulated light may be transmitted from the at least one spatial light modulator 106 through the polarizer 112 and quarter-wave plate 114 to the at least one magnifying lens 108 for output to the eye 110 of the user of the VR display. The combination of the polarizer 112 and quarter-wave plate 114 functions to improve image contrast.

In the present embodiment, light is transmitted by the at least one coherent light source 102 through the at least one holographic waveguide 104. The light output by the at least one holographic waveguide 104 is in turn transmitted through the quarter-wave plate 114 to the spatial light modulator 106 for modulation thereof. The modulated light output by the spatial light modulator 106 is then transmitted back through the quarter-wave plate 114 and in turn through the polarizer 112 in order to polarize the modulated light. The polarized and modulated light is transmitted through the magnifying lens 108 for output to the eye 110 of the user.

Similar to implementation 300 of FIG. 3, in the context of the present embodiment the total image distance (d_tot) supported by the VR display 200 is calculated as a function of the distance between the at least one magnifying lens 108 and the eye (e.g. pupil) of the user (i.e. eye relief e), the distance between the at least one magnifying lens 108 and the focusing optics (i.e. focal length f), and the distance between the at least one spatial light modulator 106 and the focusing optics (i.e. SLM image distance d). For example, Table 1 above illustrates an equation that may be used to calculate the total image distance (d_tot) for implementation 400.

Figure 5:
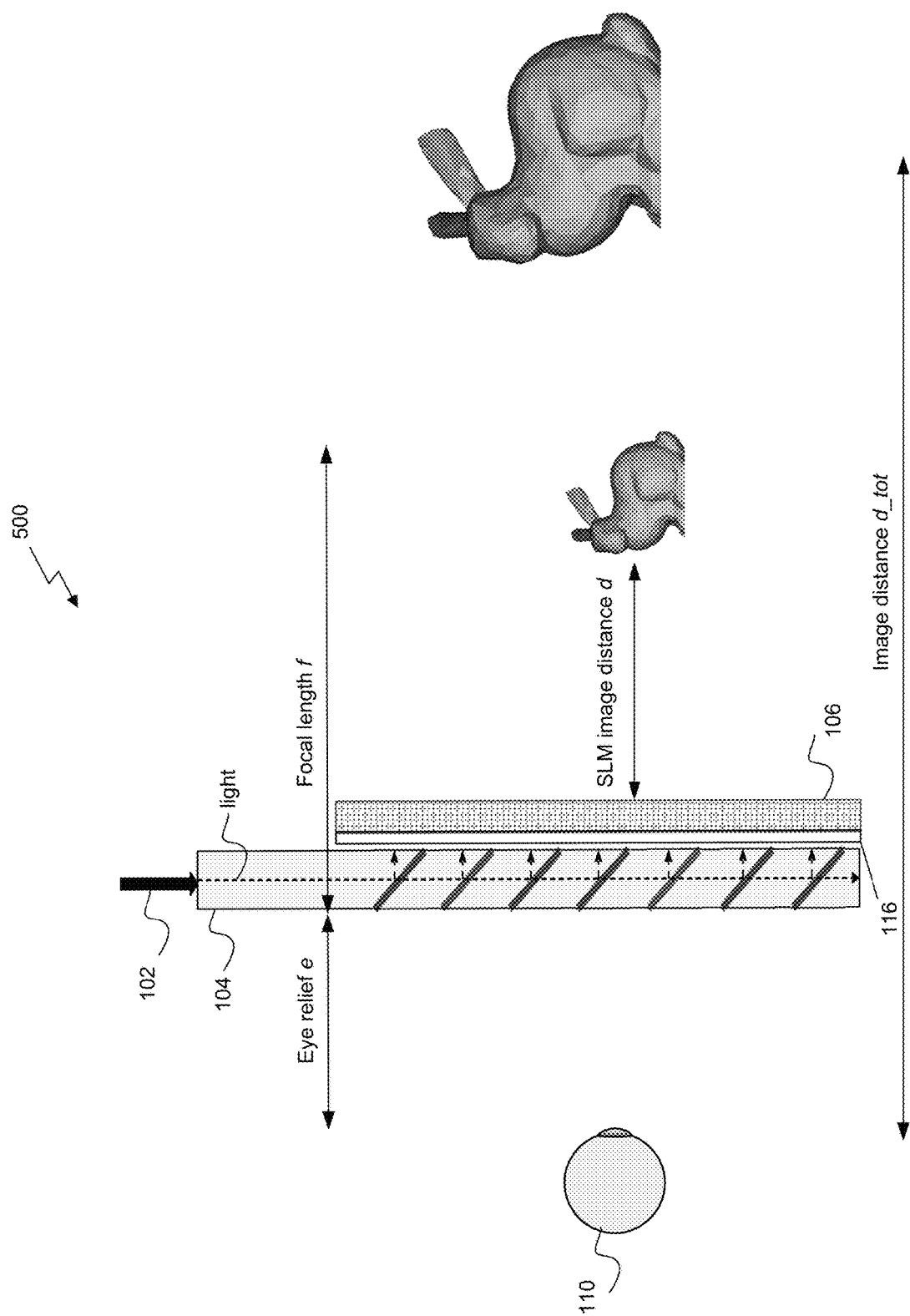
FIG. 5 illustrates an implementation of a VR display having a coherent light source, a holographic waveguide, and an adjacent magnifying lens and spatial light modulator, in accordance with an embodiment.

FIG. 5 illustrates an implementation 500 of a VR display having a coherent light source, a holographic waveguide, and an adjacent magnifying lens and spatial light modulator, in accordance with an embodiment. It should be noted that the aforementioned definitions and/or description may equally apply to the description below.

As shown, at least one holographic waveguide 104 is coupled to at least one coherent light source 102 to receive light therefrom. Additionally, at least one spatial light modulator 106 is indirectly coupled to a first face of the at least one holographic waveguide 104 to modulate the light. Situated (coupled) between the at least one spatial light modulator 106 and the at least one holographic waveguide 104 is a magnifying lens 116. As opposed to the embodiments of other Figures described herein, the present implementation 500 of the VR display does not include a magnifying lens on the face of the at least one holographic waveguide 104 facing the user (i.e. opposite the first face of the at least one holographic waveguide 104). Instead, in the present embodiment the magnifying lens 116 may be located behind the holographic waveguide 104, from the perspective of the user.

In the present embodiment, light is transmitted by the at least one coherent light source 102 through the at least one holographic waveguide 104. The light output by the at least one holographic waveguide 104 is in turn transmitted through the magnifying lens 116 to the spatial light modulator 106 for modulation thereof. The modulated light output by the spatial light modulator 106 is then transmitted back through the magnifying lens 116 for output to the eye 110 of the user.

Similar to implementation 300 of FIG. 3, in the context of the present embodiment the total image distance (d_tot) supported by the VR display is calculated as a function of the distance between the at least one magnifying lens 108 and the eye (e.g. pupil) of the user (i.e. eye relief e), the distance between the at least one magnifying lens 108 and the focusing optics (i.e. focal length f), and the distance between the at least one spatial light modulator 106 and the focusing optics (i.e. SLM image distance d). For example, Table 1 above illustrates an equation that may be used to calculate the total image distance (d_tot) for implementation 500.

Figure 6A:
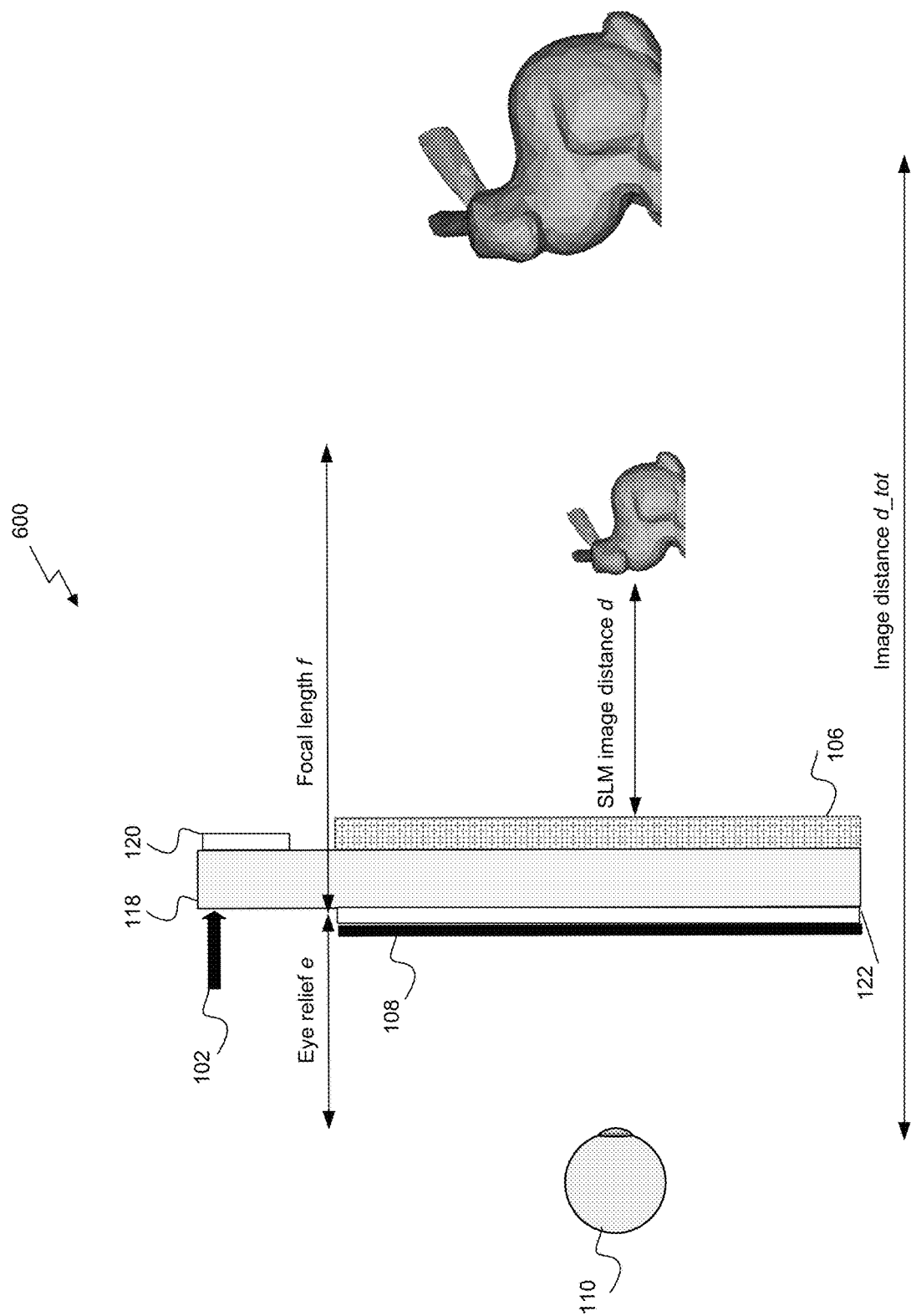
FIG. 6A illustrates an implementation of a VR display having a coherent light source, a holographic waveguide with in-coupler and out-coupler, a magnifying lens, and a spatial light modulator, in accordance with an embodiment.

FIG. 6A illustrates an implementation 600 of a VR display having a coherent light source, a holographic waveguide with in-coupler and out-coupler, a magnifying lens, and a spatial light modulator, in accordance with an embodiment. It should be noted that the aforementioned definitions and/or description may equally apply to the description below.

As shown, at least one holographic waveguide 118 is coupled to at least one coherent light source 102 to receive light therefrom. The at least one holographic waveguide 118 has an in-coupler 120 and out-coupler 122. The in-coupler 120 directs the light from the light source 102 into the at least one holographic waveguide 118 and the out-coupler 122 directs the light out of the at least one holographic waveguide 118. Additionally, at least one spatial light modulator 106 is coupled to a first face of the at least one holographic waveguide 104. Further, with respect to the present embodiment, at least one at least one magnifying lens 108 is indirectly coupled to a second face of the at least one holographic waveguide 104 that is opposite the first face of the at least one holographic waveguide 104. In the present embodiment, as shown, the out-coupler 122 is situated (coupled) between the at least one at least one magnifying lens 108 and the at least one holographic waveguide 118.

In the present embodiment, light is transmitted by the at least one coherent light source 102 and is directed by the in-coupler 120 to the at least one holographic waveguide 118. The out-coupler 122 directs the light out of the at least one holographic waveguide 118 to the spatial light modulator 106 for modulation thereof. Thus, the spatial light modulator 106 may be located on the out-coupler 122 side of the holographic waveguide 118. The modulated light output by the spatial light modulator 106 is then transmitted through the at least one at least one magnifying lens 108 for output to the eye 110 of the user.

Similar to implementation 300 of FIG. 3, in the context of the present embodiment the total image distance (d_tot) supported by the VR display is calculated as a function of the distance between the at least one magnifying lens 108 and the eye (e.g. pupil) of the user (i.e. eye relief e), the distance between the at least one magnifying lens 108 and the focusing optics (i.e. focal length f), and the distance between the at least one spatial light modulator 106 and the focusing optics (i.e. SLM image distance d). For example, Table 1 above illustrates an equation that may be used to calculate the total image distance (d_tot) for implementation 600.

Figure 6B:
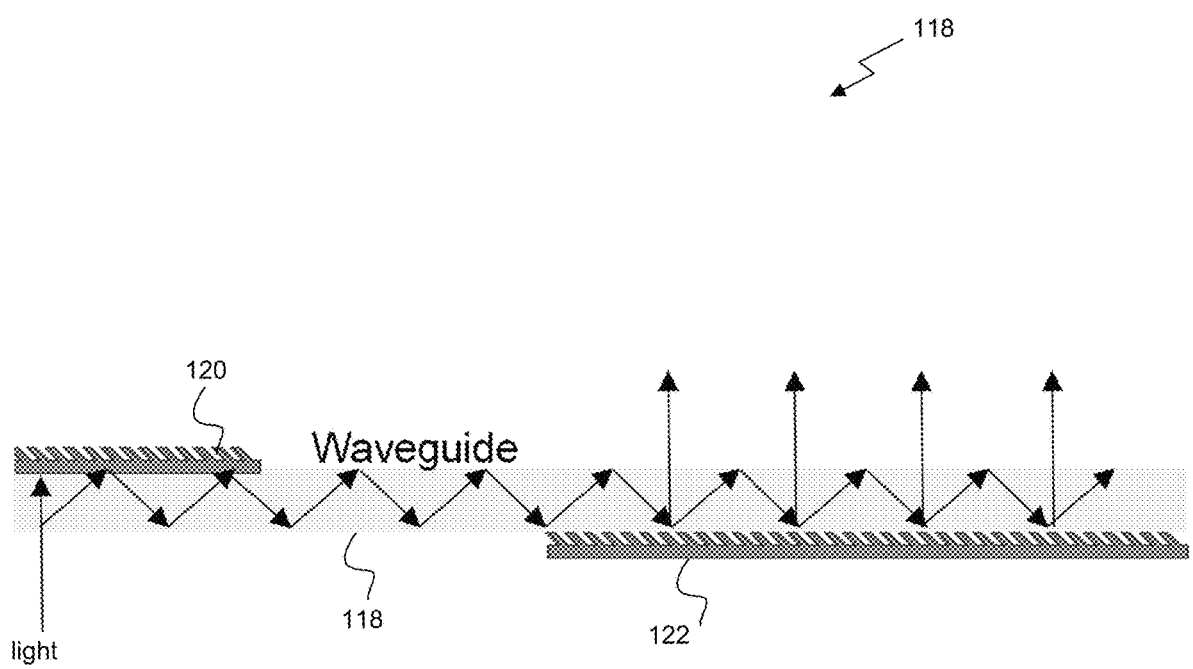
FIG. 6B illustrates an implementation of the holographic waveguide of FIG. 6A, in accordance with an embodiment.

FIG. 6B illustrates an implementation of the holographic waveguide of FIG. 6A, in accordance with an embodiment. As shown, the in-coupler 120 directs the light (from the light source 102) into the at least one holographic waveguide 118 and the out-coupler 122 directs the light out of the at least one holographic waveguide 118.

Figure 7:
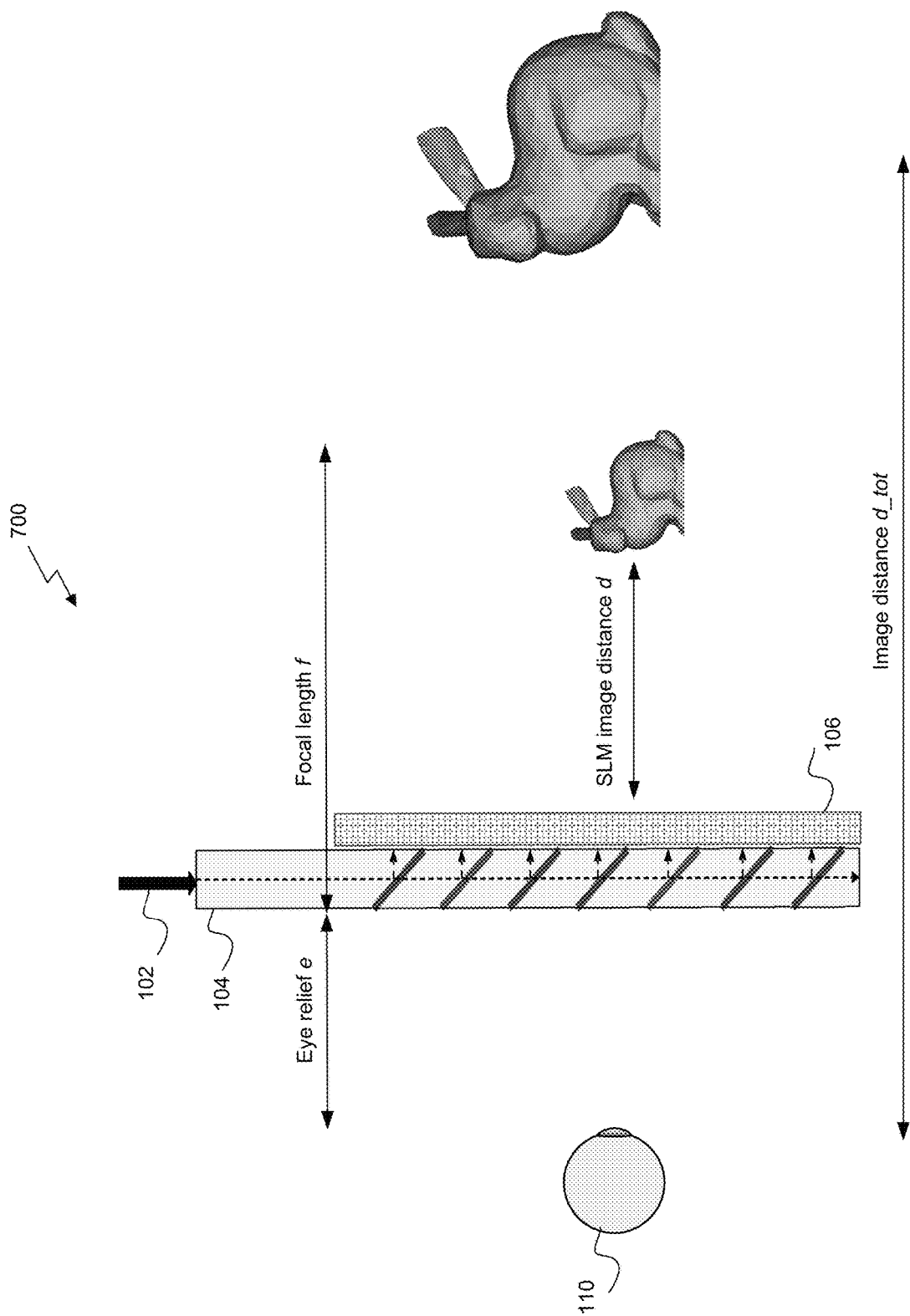
FIG. 7 illustrates an implementation of a VR display having a coherent light source, a holographic waveguide, and a spatial light modulator, in accordance with an embodiment.

FIG. 7 illustrates an implementation 700 of a VR display having a coherent light source, a holographic waveguide, and a spatial light modulator, in accordance with an embodiment. For example, the implementation 700 may include VR display 100 of FIG. 1. It should be noted that the aforementioned definitions and/or description may equally apply to the description below.

As shown, at least one holographic waveguide 104 is coupled to at least one coherent light source 102 to receive light therefrom. Additionally, at least one spatial light modulator 106 is coupled to a first face of the at least one holographic waveguide 104 to modulate the light. The first face is opposite a second face of the at least one holographic waveguide 104 facing an eye 100 of a user of the VR display.

In the present embodiment, light is transmitted by the at least one coherent light source 102 through the at least one holographic waveguide 104. The light output by the at least one holographic waveguide 104 is in turn transmitted to the spatial light modulator 106 for modulation thereof. The modulated light is output by the spatial light modulator 106 for viewing by the eye 110 of the user.

In the context of the present embodiment, the total image distance (d_tot) supported by the VR display is calculated as a function of the distance between the at least one magnifying lens 108 and the eye (e.g. pupil) of the user (i.e. eye relief e), the distance between the at least one magnifying lens 108 and the focusing optics (i.e. focal length f), and the distance between the at least one spatial light modulator 106 and the focusing optics (i.e. SLM image distance d). For example, Table 1 above illustrates an equation that may be used to calculate the total image distance (d_tot) for implementation 700.

Figure 8A:
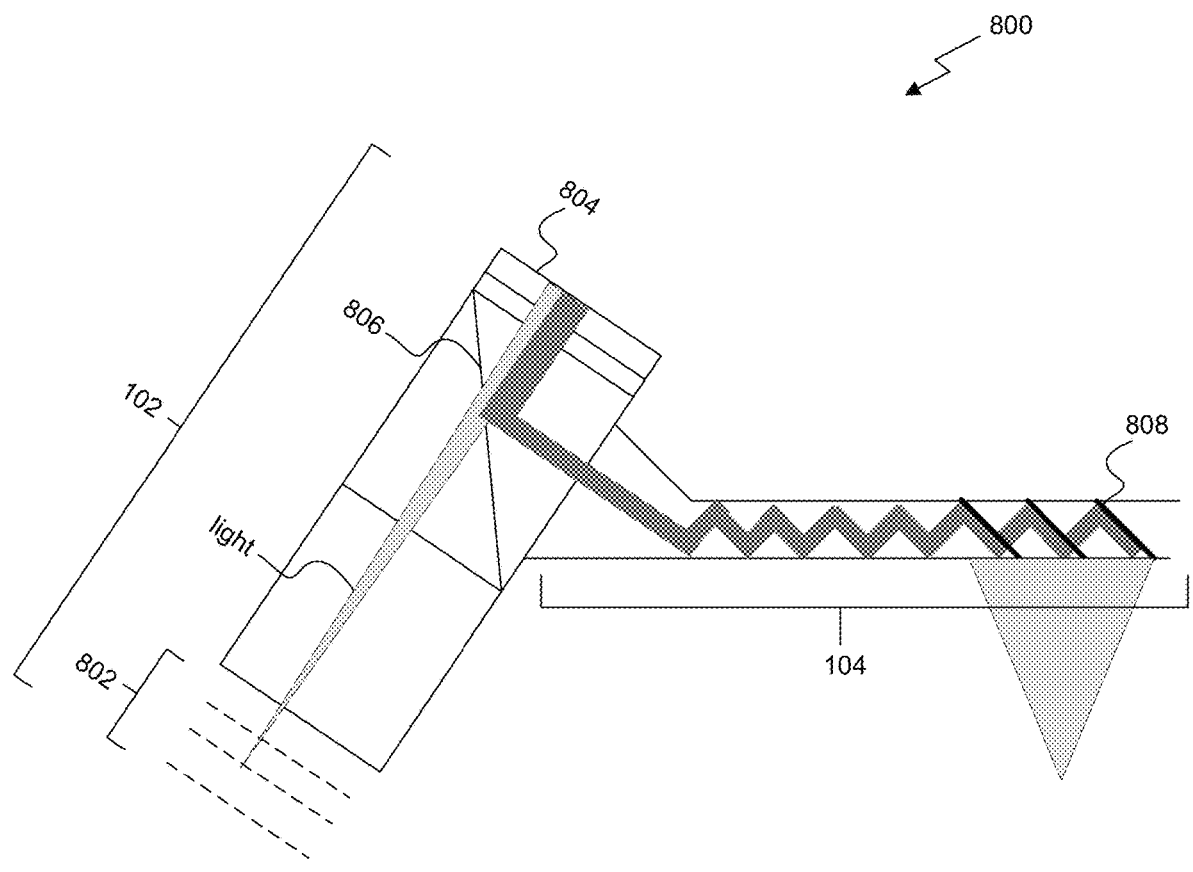
FIG. 8A illustrates an implementation of the components of a coherent light source that is coupled to a holographic waveguide, in accordance with an embodiment.

FIG. 8A illustrates an implementation 800 of the components of a coherent light source that is coupled to a holographic waveguide, in accordance with an embodiment. For example, the implementation 800 may be included in VR display 100 of FIG. 1. It should be noted that the aforementioned definitions and/or description may equally apply to the description below.

As shown, a holographic waveguide 104 is coupled to a coherent light source 102 to receive light therefrom. The coherent light source 102 includes a point light source 802 that emits the light. The point light source 802 may be any light emitting device that outputs a beam of light, which may be narrow. For example, the point light source 802 may be a laser source that generates and outputs a laser beam.

The point light source 802 is coupled to a concave mirror 804 that reflects the light emitted by the point light source 802. Thus, the point light source 802 is situated to emit the light in a direction toward the concave mirror 804. The concave mirror 804 may also be configured to collimate the light received from the point light source 802. The concave mirror 804 is coupled to a beam splitter 806 that directs the light reflected by the concave mirror 804 to the holographic waveguide 104. Thus, the beam splitter 806 is situated with respect to the concave mirror 804 and the holographic waveguide 104 such that the beam splitter 806 receives the light reflected by the concave mirror 804 and directs the light to (e.g. an in-coupler of) the holographic waveguide 104.

The components of the coherent light source 102, as illustrated herein, may operate to expand and collimate the light emitted by the point light source 802 and to direct the light to the holographic waveguide 104. It should be noted that the materials, angles, lengths, and/or any other features of the components of the coherent light source 102 may be configured as desired to achieve the output of light, that is at least partially coherent, to the holographic waveguide 104. The holographic waveguide 104 includes at least one holographic element or function to direct the light received from the coherent light source 102 through the holographic waveguide 104 to an output (e.g. out-coupler) of the holographic waveguide 104. In the present embodiment shown, the holographic waveguide 104 includes an array of partial mirrors 808 configured to output the light.

In an embodiment, the multiple prism structure inside the holographic waveguide 104 can create a ghost image and may result in additional image degradation. As an option, the wavelengths of the lightguide (i.e. with half mirrors) or the waveguide [diffractive optical element (DOE)-based or holographic optical element (HOE)-based] may be matched with the input coherent light source 102 (e.g. in 3 colors (R,G,B)) to avoid the ghost image/image degradation. Otherwise, a different holographic waveguide configuration may be used.

Figure 8B:
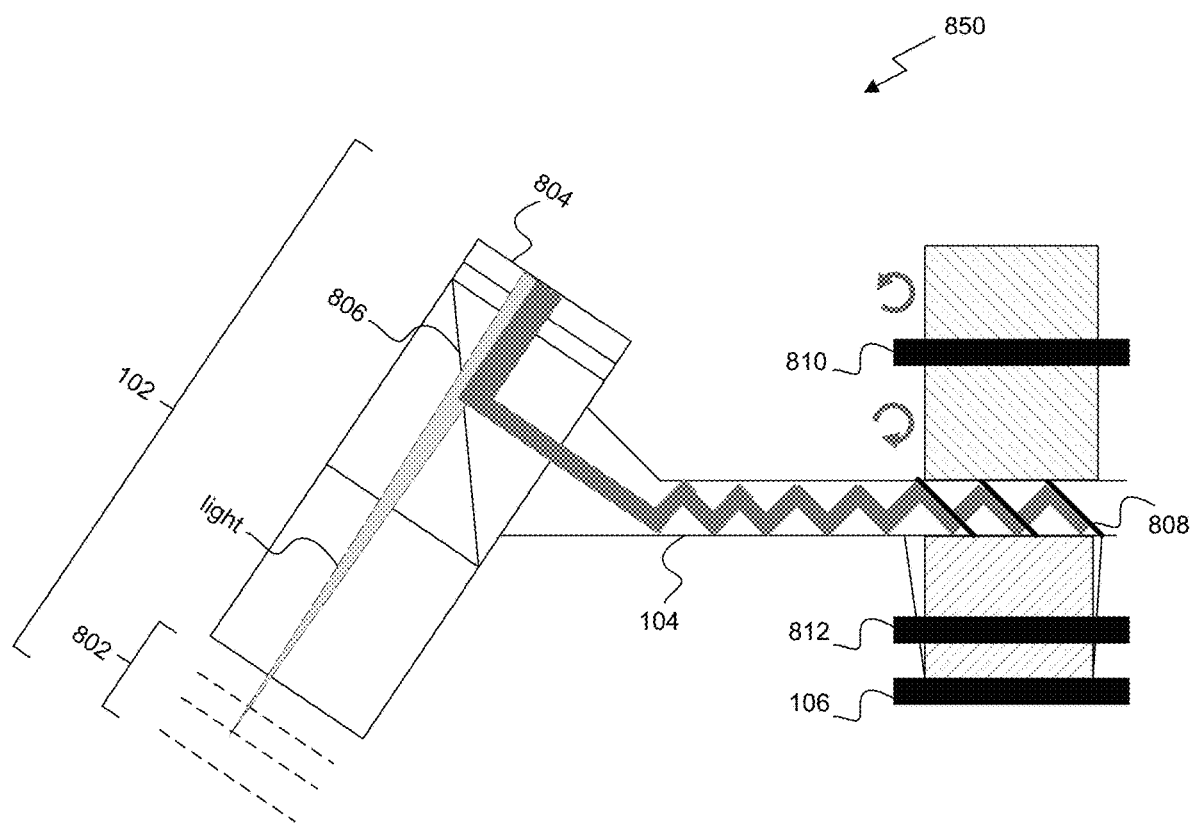
FIG. 8B illustrates a modified implementation of the implementation of FIG. 8A, which further includes a geometric phase lens and a quarter wave plate, in accordance with an embodiment.

FIG. 8B illustrates a modified implementation 850 of the implementation 800 of FIG. 8A, which further includes a geometric phase lens and a quarter wave plate, in accordance with an embodiment. Thus, the description of FIG. 8A may equally apply to the present embodiment illustrated in FIG. 8B.

As shown, the holographic waveguide 104 is coupled to a geometric phase lens 810 on one side and a quarter wave plate 812 on the other side with the spatial light modulator 106. The quarter wave plate 812 is situated between the holographic waveguide 104 and the spatial light modulator 106.

The geometric phase lens 810 and the quarter wave plate 812 may be included for the implementation 800 of FIG. 8A as an alternative to the combination of a Fresnel lens and linear polarizer (e.g. as illustrated in FIG. 4). For example, in the context of the implementation 800 of FIG. 8A, use of a Fresnel lens may cause holographic images to not be seen without a linear polarizer, since the linear polarization look differently after the folded optical path. The incident light to the spatial light modulator 106 should have a certain polarization (e.g. linearly polarized in a 45-degree slanted direction) and, when using a Fresnel lens, another linear polarizer may be needed to observe the holographic images. Furthermore, the saw-tooth pattern on the Fresnel lens surface may create a high frequency noise pattern with the coherent light source 102 in which it will be unsuitable for use in displaying holographic images.

Use of the geometric phase lens 810 and the quarter wave plate 812, as illustrated in the modified implementation 850 of FIG. 8B, avoids the above noted issues associated with the Fresnel lens and linear polarizer combination.

Figure 9:
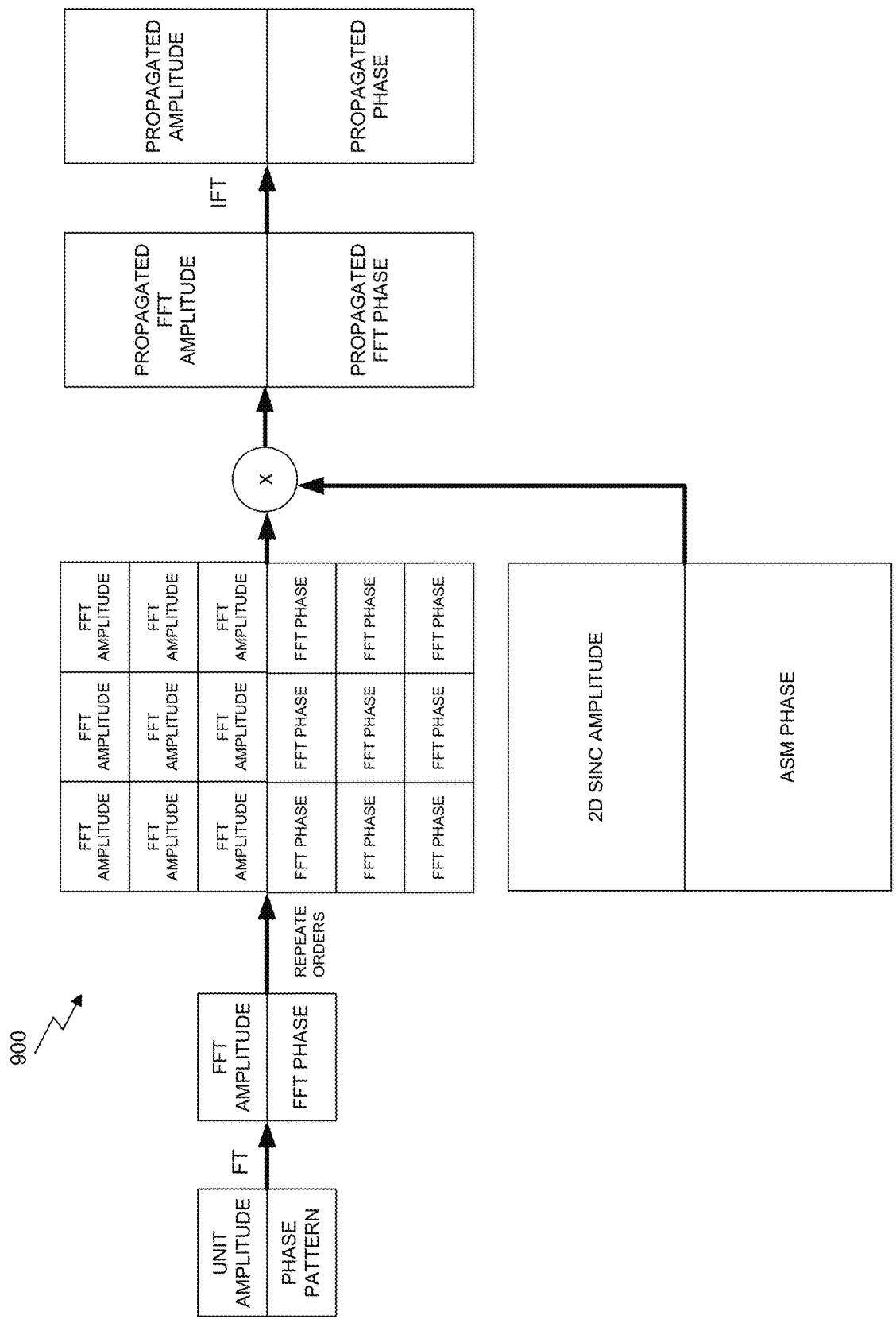
FIG. 9 illustrates a propagation pipeline for optimizing a spatial light modulator, in accordance with an embodiment.

FIG. 9 illustrates a propagation pipeline 900 for optimizing a spatial light modulator, in accordance with an embodiment. The propagation pipeline 900 may be used to optimize the spatial light modulator of any of the previous Figures and/or embodiments. Again, It should be noted that the aforementioned definitions and/or description may equally apply to the description below.

In a holographic VR display (e.g. see FIG. 1), a spatial light modulator programmatically modulates the phase of light (e.g. polarized laser illumination). The resulting phase modulated wavefront output by the spatial light modulator propagates to a target volume where interference produces a desired output (e.g. image or 3D scene). Thus, an algorithm is used to compute a phase pattern to be used by the spatial light modulator to produce the desired output.

Typically, the finite pixel pitch of the spatial light modulator will result in higher order diffractive copies which overlap with the desired image and reduce the image quality. To date, an aperture has been required to remove these copies (i.e. to block, filter, etc. the higher orders).

The present propagation pipeline 900 allows for a filter-less implementation of a holographic VR display, even for example where the spatial light modulator produces the higher order copies. At the start of the propagation pipeline 900, a complex wavefront at the spatial light modulator is simulated using a phase pattern and unit amplitude. This is fourier transformed (FT) to move to the frequency domain, illustrated as the FFT amplitude and FFT phase.

The frequency domain is repeated to produce the higher order copies (illustrated as the repeating FFT amplitude and FFT phase copies). The propagation is then performed by multiplying the wavefront by a 2D sinc amplitude, which accounts for the finite pixel pitch of the spatial light modulator, and an angular spectrum method (ASM) phase delay, thus resulting in the propagation FFT amplitude and propagation FFT phase. The output of the propagation pipeline 900 is computed by converting the propagation FFT amplitude and the propagation FFT phase back from the frequency domain, to produce the propagation amplitude and propagation phase to be used by the spatial light modulator.

The use of the repeated frequency domain and the 2D sinc amplitude, together, produce a propagation pipeline that accurately simulates the higher orders. In this way, the spatial light modulator may be optimized with the propagation amplitude and propagation phase such that the desired output is produced by the spatial light modulator. Using this propagation pipeline 900, image quality can be improved when optical filtering is not present in the holographic VR display. Removing the need for the optical filter may in turn enable a more compact holographic VR display without sacrificing image quality. Further, utilizing the light from the higher orders will increase the etendue of the holographic VR display without adding additional hardware components.

Figure 10:
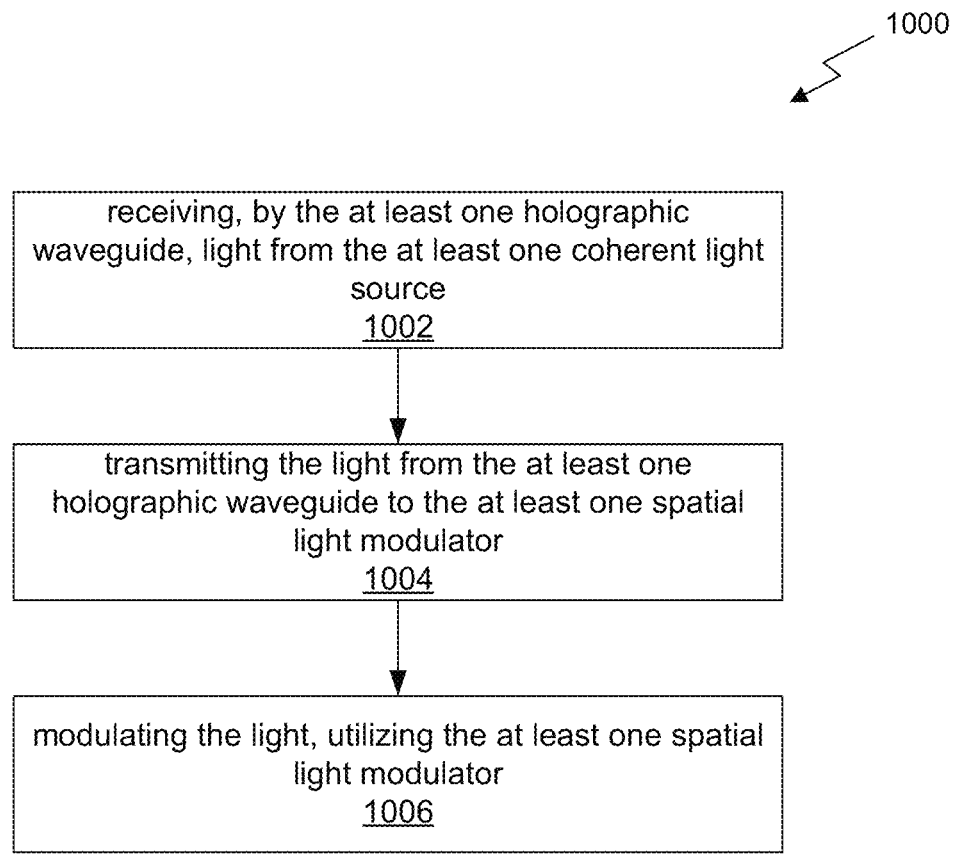
FIG. 10 illustrates a method of operation of a HMD, in accordance with an embodiment.

FIG. 10 illustrates a method 1000 of operation of a HMD, in accordance with an embodiment. In one embodiment, the method 1000 may be carried out using the implementation 700 of VR display (described in FIG. 7) as the HMD, such that the HMD includes at least one coherent light source, at least one holographic waveguide (e.g. backlight holographic waveguide, holographic waveguide with at least one waveguide coupler, holographic waveguide including a waveguide in-coupler, and a waveguide out-coupler, etc.) coupled to the at least one coherent light source, and at least one spatial light modulator coupled to the at least one holographic waveguide (e.g. with no space therebetween). As an option, in the context of the HMD of the present embodiment, a combined cross-sectional thickness of the at least one holographic waveguide and the at least one spatial light modulator may be less than 10 mm, or in some embodiments less than 7 mm.

In other embodiments, HMD may be an augmented reality (AR) display or a mixed reality (MR) display. Thus, HMD may not necessarily be limited to a VR display, but, with a similar configuration to the VR display 100 of FIG. 1, the HMD may also include a camera for capturing live images in order to create AR or MR images and/or video. Of course, any of the embodiments described above with respect to the various Figures may be employed in the context of the HMD performing the present method 800.

In operation 1002, light from the at least one coherent light source is received by the at least one holographic waveguide. In operation 1004, the light is transmitted from the at least one holographic waveguide to the at least one spatial light modulator. In operation 1006, the light is modulated utilizing the at least one spatial light modulator.

In one embodiment, the HMD may further include at least one magnifying lens. In this embodiment, the method 1000 may include transmitting the modulated light through the at least one magnifying lens. The at least one magnifying lens may include a Fresnel lens or a holographic lens. As an option, the at least one magnifying lens and the at least one holographic waveguide may be directly coupled with no space therebetween.

In another embodiment, the HMD may include at least one polarization element coupled between the at least one magnifying lens and the at least one holographic waveguide. In this other embodiment, the method 1000 may include polarizing the light or the modulated light utilizing the at least one polarization element, where the polarized modulated light is transmitted through the at least one magnifying lens. Of course, in other embodiments the HMD may not include a polarization element such that the light may not be polarized.

In yet another embodiment, the HMD may include at least one quarter-wave element coupled between the at least one holographic waveguide and the at least one spatial light modulator. With respect to this yet another embodiment, the method 1000 may include modifying the light from the at least one holographic waveguide, utilizing the at least one quarter-wave element, wherein the modified light is received by the at least one spatial light modulator.

In still yet another embodiment, the HMD may not include a beam splitter. In yet even a further embodiment, the HMD may include a receiver. In this further embodiment, the method 1000 may include receiving, by the receiver, pixel data from a remote source over a network, for display via the HMD. The HMD may perform the method 1000 to output the pixel data as a VR image or video for viewing by the user. The remote source may be the exemplary computing system described below with respect to FIG. 11.

Figure 11:
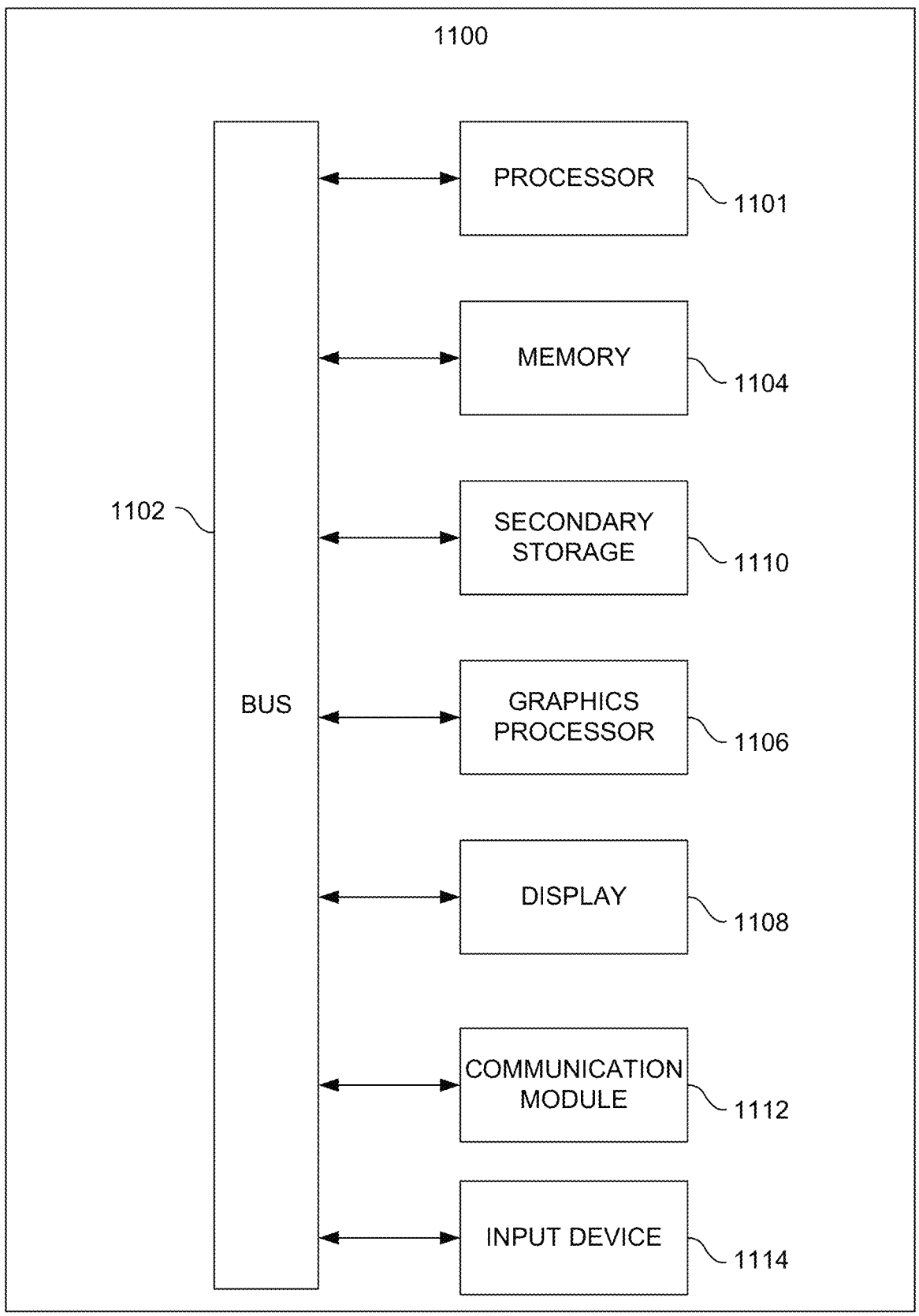
FIG. 11 illustrates an exemplary computing system, in accordance with an embodiment.

FIG. 11 illustrates an exemplary computing system 1100, in accordance with an embodiment. The HMD of the method 1000 of FIG. 10 (not shown), or the VR display 100 of FIG. 1 or of any other embodiment described above (also not shown), may be in communication with the system 1100 to receive output of the system 1100 and to provide input to the system 1100. Just by way of example, the HMD/VR display may receive from the system 1100 virtual images in the form of pixel data. The HMD/VR display and the system 1100 may be located in the same environment, or remotely (e.g. the system 1100 may be located in the cloud). It should be noted that the HMD/VR display may communicate with the system 1100 via a wired connection or a wireless network connection (e.g. WiFi, cellular network etc.). As an option, one or more of the components shown in system 1100 may be implemented within the HMD/VR display.

As shown, the system 1100 includes at least one central processor 1101 which is connected to a communication bus 1102. The system 1100 also includes main memory 1104 [e.g. random access memory (RAM), etc.]. The system 1100 also includes a graphics processor 1106 and a display 1108.

The system 1100 may also include a secondary storage 1110. The secondary storage 1110 includes, for example, a hard disk drive and/or a removable storage drive, representing a floppy disk drive, a magnetic tape drive, a compact disk drive, a flash drive or other flash storage, etc. The removable storage drive reads from and/or writes to a removable storage unit in a well-known manner.

Computer programs, or computer control logic algorithms, may be stored in the main memory 1104, the secondary storage 1110, and/or any other memory, for that matter. Such computer programs, when executed, enable the system 1100 to perform various functions, including for example calibration of the HMD 102, forming of live video, and coloring of pixels on display 104, as set forth above. The computer programs, when executed, may also enable integration of live video with a virtual environment to provide a modified virtual reality, a mixed reality, or an augmented reality to the user. Memory 1104, storage 1110 and/or any other storage are possible examples of non-transitory computer-readable media.

The system 1100 may also include one or more communication modules 1112. The communication module 1112 may be operable to facilitate communication between the system 1100 and one or more networks, and/or with one or more devices (e.g. game consoles, personal computers, servers etc.) through a variety of possible standard or proprietary wired or wireless communication protocols (e.g. via Bluetooth, Near Field Communication (NFC), Cellular communication, etc.).

As also shown, the system 1100 may include one or more input devices 1114. The input devices 1114 may be a wired or wireless input device. In various embodiments, each input device 1114 may include a keyboard, touch pad, touch screen, game controller, remote controller, or any other device capable of being used by a user to provide input to the system 1100.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   a virtual reality (VR) display, including:
      at least one coherent light source,
      at least one holographic waveguide coupled to the at least one coherent light source to receive light therefrom, and
      at least one spatial light modulator coupled to the at least one holographic waveguide to modulate the light;
      wherein the coherent light source includes a point light source that emits the light, a concave mirror that reflects the light emitted by the point light source, and a beam splitter that directs the light reflected by the concave mirror to the holographic waveguide;
   wherein a phase and amplitude to be used by the spatial light modulator is determined based on a simulation where:
      a complex wavefront at the spatial light modulator is simulated using an input phase and an input amplitude,
      the input phase and the input amplitude are transformed to move to a frequency domain of the spatial light modulator,
      the frequency domain is repeated to produce a plurality of higher order copies of the input phase and the input amplitude in the frequency domain,
      the plurality of higher order copies of the input phase and the input amplitude are multiplied by an angular spectrum method (ASM) phase delay and a two-dimensional (2D) sinc amplitude that accounts for a finite pixel pitch of the spatial light modulator, to result in a propagation amplitude and propagation phase in the frequency domain, and
      the propagation amplitude and propagation phase in the frequency domain are converted back from the frequency domain to produce the phase and the amplitude to be used by the spatial light modulator.

2. The apparatus of claim 1, wherein the VR display further includes at least one magnifying lens.

3. The apparatus of claim 2, wherein the at least one magnifying lens includes a Fresnel lens.

4. The apparatus of claim 2, wherein the at least one magnifying lens includes a holographic lens.

5. The apparatus of claim 2, wherein the VR display further includes at least one polarization element coupled between the at least one magnifying lens and the at least one holographic waveguide.

6. The apparatus of claim 1, wherein the VR display further includes at least one quarter-wave element coupled between the at least one holographic waveguide and the at least one spatial light modulator.

7. The apparatus of claim 1, wherein the at least one holographic waveguide includes a backlight holographic waveguide.

8. The apparatus of claim 1, wherein the at least one holographic waveguide includes a holographic waveguide with at least one waveguide coupler.

9. The apparatus of claim 1, wherein the at least one holographic waveguide includes a holographic waveguide including a waveguide in-coupler, and a waveguide out-coupler.

10. The apparatus of claim 1, wherein the apparatus is configured such that the light is polarized.

11. The apparatus of claim 1, wherein a combined cross-sectional thickness of the at least one holographic waveguide and the at least one spatial light modulator, is less than 10 mm.

12. The apparatus of claim 1, wherein a combined cross-sectional thickness of the at least one holographic waveguide and the at least one spatial light modulator, is less than 7 mm.

13. The apparatus of claim 1, wherein the VR display further includes a receiver for receiving pixel data from a remote source over a network, for display via the VR display.

14. The apparatus of claim 1, wherein the VR display is filterless.

15. The apparatus of claim 1, further comprising:
   a geometric phase lens coupled to a first side of the holographic waveguide, and
   a quarter wave plate coupled to a second side of the holographic waveguide with the spatial light modulator, wherein the quarter wave plate is coupled between the holographic waveguide and the spatial light modulator.

16. A method, comprising:
   at head-mounted display including at least one coherent light source, at least one holographic waveguide coupled to the at least one coherent light source, and at least one spatial light modulator coupled to the at least one holographic waveguide such that a combined cross-sectional thickness of the at least one holographic waveguide and the at least one spatial light modulator is less than 10 mm, and wherein the coherent light source includes a point light source that emits the light, a concave mirror that reflects the light emitted by the point light source, and a beam splitter that directs the light reflected by the concave mirror to the holographic waveguide:
      receiving, by the at least one holographic waveguide, light from the at least one coherent light source;
      transmitting the light from the at least one holographic waveguide to the at least one spatial light modulator; and
      modulating the light, utilizing the at least one spatial light modulator;
   wherein a phase and amplitude to be used by the spatial light modulator is determined based on a simulation where:

a complex wavefront at the spatial light modulator is simulated using an input phase and an input amplitude, the input phase and the input amplitude are transformed to move to a frequency domain of the spatial light modulator, the frequency domain is repeated to produce a plurality of higher order copies of the input phase and the input amplitude in the frequency domain, the plurality of higher order copies of the input phase and the input amplitude are multiplied by an angular spectrum method (ASM) phase delay and a two-dimensional (2D) sinc amplitude that accounts for a finite pixel pitch of the spatial light modulator, to result in a propagation amplitude and propagation phase in the frequency domain, and the propagation amplitude and propagation phase in the frequency domain are converted back from the frequency domain to produce the phase and the amplitude to be used by the spatial light modulator.

17. The method of claim 16, wherein the head-mounted display further includes at least one magnifying lens, and the method further comprising:

transmitting the modulated light through the at least one magnifying lens.

18. The method of claim 17, wherein the at least one magnifying lens includes a Fresnel lens.

19. The method of claim 17, wherein the at least one magnifying lens includes a holographic lens.

20. The method of claim 17, wherein the head-mounted display further includes at least one polarization element coupled between the at least one magnifying lens and the at least one holographic waveguide, and the method further comprising:

polarizing the modulated light utilizing the at least one polarization element, wherein the polarized modulated light is transmitted through the at least one magnifying lens.

21. The method of claim 16, wherein the head-mounted display further includes at least one quarter-wave element coupled between the at least one holographic waveguide and the at least one spatial light modulator, and the method further comprising:

modifying the light from the at least one holographic waveguide, utilizing the at least one quarter-wave element, wherein the modified light is received by the at least one spatial light modulator.

22. The method of claim 16, wherein the at least one holographic waveguide includes a backlight holographic waveguide.

23. The method of claim 16, wherein the at least one holographic waveguide includes a holographic waveguide with at least one waveguide coupler.

24. The method of claim 16, wherein the at least one holographic waveguide includes a holographic waveguide including a waveguide in-coupler, and a waveguide out-coupler.

25. The method of claim 16, further comprising:
polarizing the light.

26. The method of claim 16, wherein a combined cross-sectional thickness of the at least one holographic waveguide and the at least one spatial light modulator, is less than 7 mm.

27. The method of claim 16, wherein the head-mounted display further includes a receiver, and the method further comprising:

receiving, by the receiver, pixel data from a remote source over a network, for display via the head-mounted display.

* * * * *